(12) United States Patent  
Khrapko et al.

(10) Patent No.: US 11,294,122 B2  
(45) Date of Patent: Apr. 5, 2022

(54) POLARIZATION CONTROLLER AND METHOD OF MANUFACTURE

(71) Applicant: CORNING INCORPORATED, Corning, NY (US)

(72) Inventors: Rostislav Radiyevich Khrapko, Corning, NY (US); William James Miller, Horseheads, NY (US); Daniel Aloysius Nolan, Corning, NY (US); Katerina Hristova Rousseva, Painted Post, NY (US); Lucas Wayne Yeary, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 17/322,005

(22) Filed: May 17, 2021

(65) Prior Publication Data  
US 2022/0035096 A1 Feb. 3, 2022

Related U.S. Application Data

(60) Provisional application No. 63/059,589, filed on Jul. 31, 2020.

(51) Int. Cl.  
*G02B 6/02* (2006.01)  
*G02B 6/024* (2006.01)  
*G02B 6/14* (2006.01)  
*G02B 6/27* (2006.01)  
*G02B 6/44* (2006.01)

(52) U.S. Cl.  
CPC .......... *G02B 6/2766* (2013.01); *G02B 6/024* (2013.01); *G02B 6/0238* (2013.01); *G02B 6/02395* (2013.01); *G02B 6/14* (2013.01); *G02B 6/4405* (2013.01)

(58) Field of Classification Search  
CPC .. G02B 6/0238; G02B 6/02395; G02B 6/024; G02B 6/14; G02B 6/2766; G02B 6/4405  
See application file for complete search history.

(56) References Cited

U.S. PATENT DOCUMENTS

| 4,354,736 A * | 10/1982 | Maklad | C03B 37/01217 385/11 |
| 4,389,090 A | 6/1983 | Le Fevre | |
| 4,691,984 A | 9/1987 | Thaniyavarn | |
| 6,282,341 B1 * | 8/2001 | Digonnet | G02B 6/02071 385/10 |

(Continued)

FOREIGN PATENT DOCUMENTS

EP 3301489 A1 2/2021

OTHER PUBLICATIONS

Official search report from United Kingdom IP Office (including X-, Y-, A-type references p. 4), dated Feb. 3, 2021.

(Continued)

*Primary Examiner* — Ryan A Lepisto  
(74) *Attorney, Agent, or Firm* — Russell S. Magaziner

(57) ABSTRACT

A polarization controller comprising: (i) an optical fiber, and (ii) a carrier surrounding the optical fiber, the carrier comprising an off-center through hole with at least one collapsed region, such that the optical fiber is situated within the through hole and contacts the at least one collapsed region of the through hole, and the collapsed region exerts pressure on the optical fiber.

9 Claims, 10 Drawing Sheets

(56) References Cited

U.S. PATENT DOCUMENTS

| | | | | |
|---|---|---|---|---|
| 6,408,117 B1* | 6/2002 | Mollenauer | ............... | G02B 6/14 |
| | | | | 385/37 |
| 6,480,637 B1* | 11/2002 | Yao | ....................... | G02F 1/0134 |
| | | | | 385/1 |
| 6,661,937 B2* | 12/2003 | Sobiski | .................. | G02B 6/105 |
| | | | | 359/489.07 |
| 6,885,782 B2* | 4/2005 | Wood | ..................... | G02B 6/105 |
| | | | | 250/227.17 |
| 7,340,132 B2* | 3/2008 | Ramachandran | .. | G02B 6/02071 |
| | | | | 385/11 |
| 7,565,037 B2* | 7/2009 | Popescu | ................. | G02B 6/105 |
| | | | | 356/369 |
| 9,770,862 B2* | 9/2017 | Swinehart | .............. | B05D 3/002 |
| 2006/0197012 A1* | 9/2006 | Udd | ....................... | G01L 1/246 |
| | | | | 250/227.14 |
| 2016/0025584 A1* | 1/2016 | Bals | ..................... | G01L 11/025 |
| | | | | 250/227.14 |
| 2016/0070124 A1 | 3/2016 | Liu et al. | | |

OTHER PUBLICATIONS

Heismann et al., "Broadband Reset-Free Automatic Polarization Controller", In Electronic Letters vol. 27. No. 4, 1991, pp. 377-379.
Nagano et al., "Change of the refractive index in an optical fiber due to external forces", In Applied Optics. vol. 17. No. 13, 1978, pp. 2080-2085.

\* cited by examiner

POLARIZATION CONTROLLER AND METHOD OF MANUFACTURE

PRIORITY

This application claims priority to U.S. Application No. 63/059,589 filed Jul. 31, 2020 and to U.K. Application No. 2012809.6 filed Aug. 17, 2020, each of which in incorporated by reference herein in its entirety.

BACKGROUND

The disclosure relates generally to polarization controllers and more particularly to a dynamic polarization controller utilizing a carrier with an offset through hole and an optical fiber situated therein.

The current polarization controllers utilize stressed-induced birefringence to rotate an initial state of polarization (SOP) to a desired output SOP. However, such polarization controllers are typically lossy, unreliable, and cause long-term fiber fatigue and breakage. Furthermore, such polarization controllers either (i) apply external forces directly onto an optical fiber (e.g., squeezes the fiber directly before rotating the fiber) to induce birefringence, which often leads to considerable damage to the fiber; or (ii) involve fabricating polarization controllers that comprise planar waveguides and utilize electro-optics techniques to rotate the polarization, increasing power consumption, and creating losses due to coupling and activation.

No admission is made that any reference cited herein constitutes prior art. Applicant expressly reserves the right to challenge the accuracy and pertinence of any cited documents.

SUMMARY

One embodiment of the disclosure relates to a polarization controller comprising:
(i) an optical fiber,
(ii) a carrier surrounding the optical fiber, the carrier comprising an off-center through hole with at least one collapsed region, such that the optical fiber is situated within the through hole and contacts at least one collapsed region of the through hole, and the collapsed region exerts pressure on the optical fiber.

According to at least one embodiment, the carrier is structured such that when a force is applied to the carrier at the location of the collapsed region, the pressure on the optical fiber changes and an optical signal propagating through the optical fiber undergoes a change in polarization.

According to at least one embodiment, the through hole has an axis of symmetry that is located at a distance D from the center of the carrier, such that $0.25<D/R<0.95$ where R is the half-width of the carrier cross-section.

One embodiment of the disclosure relates to a polarization controller comprising:
(i) an optical fiber,
(ii) a carrier surrounding the optical fiber, the carrier comprising glass and an off-center through hole with at least one collapsed region, such that the optical fiber is situated within the through hole and contacts at least the collapsed regions of the through hole, and at least one collapsed region exerts pressure on the optical fiber.

According to some embodiments the carrier comprises glass and an off-center through hole with multiple collapsed regions.

According to some embodiments the carrier has a circular cross-section and the center of the through hole is located at a distance D from the center of the carrier, such that $0.25<D/R<0.95$ where R is the radius of the carrier cross-section.

According to some embodiments the carrier is a glass tube. According to some embodiments the optical fiber is a single-mode fiber, a multimode fiber, or a polarization maintaining fiber with a glass cladding; and the carrier is a fluorine and/or boron doped glass tube. According to some embodiments the glass tube is coated with titanium.

According to some embodiments the carrier is a Fluorine and/or boron doped glass tube, the through hole has a cross section of 0.5 µm to 275 µm and an axis of symmetry that is located at a distance D from the center of the carrier, such that $0.25<D/R<0.95$ where R is the half width of the carrier cross-section.

According to some embodiments the carrier has a circular cross-section and the center of the through hole is located at a distance D from the center of the carrier, such that $0.25<D/R<0.95$ where R is the radius of the carrier cross-section. Preferably $0.65<D/R<0.85$. According to some embodiments $0.7<D/R<0.8$.

According to some embodiments, the collapsed region is in contact with the optical fiber. According to some embodiments at least a portion of the optical fiber situated inside the through hole contains an outer glass surface fused to the collapsed region of the through hole. According to some embodiments, the collapsed region is in contact with the optical fiber cladding and is fused to the cladding.

According to some embodiments the carrier is plastic. According to some embodiments the carrier is a plastic (i.e., polymer) tube. According to some embodiments the carrier is a Fluorine or boron doped plastic tube, the through hole of the carrier has a cross section of 0.5 µm<dhole–dfiber<400 µm (and preferably 0.5 µm to 275 µm) and an axis of symmetry that is located at a distance D from the center of the carrier, such that $0.25<D/R<0.95$ where R is the half width of the carrier cross-section. More preferably, 5 µm<dhole–dfiber<275 µm.

According to some embodiments, the collapsed region is in contact with the optical fiber. According to some embodiments at least a portion of the optical fiber situated inside the through hole contains a plastic cladding fused to the collapsed region of the through hole of the plastic carrier.

One embodiment of the disclosure relates to a polarization controller comprising:
(i) at least two optical fibers; and
(ii) a carrier surrounding the optical fibers, the carrier comprising glass and an off-center through hole with at least one collapsed region, such that the optical fibers are situated within the through hole and contact at least one collapsed region of the through hole, and at least one collapsed region exerts pressure on the optical fibers.

One embodiment of the disclosure relates to a polarization controller comprising:
(i) an optical fiber; and
(ii) a carrier surrounding the optical fiber, the carrier comprising an off-center through hole with multiple collapsed regions, such that the optical fiber is situated within the through hole and contacts at least the collapsed regions of the through hole and the multiple collapsed regions exert pressure on the optical fiber.

An additional embodiment of the disclosure relates to a method of making a polarization controller, the method comprising:
(i) supporting a polarization carrier comprising an off-centrally located through hole with at least one collapsed region surrounding the optical fiber at least one location, and
(ii) applying a force to the carrier.

According to some embodiments the collapsed region is bent

An additional embodiment of the disclosure relates to a method of making a polarization controller, the method comprising:
(i) providing a carrier with an offset hole; (ii) inserting an optical fiber through the hole; and (iii) collapsing the carrier in at least one region to form a collapsed region around the optical fiber and fusing the interface of the optical fiber to the carrier at the collapsed region.

According to one embodiment the method comprises collapsing the carrier in multiple regions to form multiple collapsed regions around the optical fiber and fusing the interface of the optical fiber to the carrier at the multiple collapsed regions. According to some embodiments the collapsed region has a length of at least 0.5 cm, and preferably at least 1 cm. For example, the collapsed region (s) may have a length of 2 cm to 15 cm, According to some embodiments, the step of collapsing the carrier to form a collapsed region around the optical fiber comprises heating at least one portion of the carrier to above 1000° C. According to some embodiments, the step of collapsing the carrier in at least one region to form a collapsed region around the optical fiber comprises applying a vacuum to a through hole of the carrier.

According to some embodiments, the step of collapsing the carrier in at least one region to form a collapsed region around the optical fiber comprises placing the carrier into a heater, such that the position of the carrier inside the heater is not symmetric.

According to some embodiments the side of the carrier closest to the through hole is located closer to the flame than the side of the carrier that is located further from the through hole.

According to some embodiments a method of controlling polarization of the light propagating through an optical fiber comprises: (i) supporting a polarization controller with an off-center through hole with at least one partially collapsed region surrounding the optical fiber at at least one location, and (ii) applying a force to the polarization controller at another location; said another location corresponding to the partially collapsed region According to some embodiments a method of controlling polarization of the light propagating through an optical fiber comprises:
(i) supporting a polarization controller with an off-center through hole with at least one partially collapsed region surrounding the optical fiber at at least one location, and (ii) applying a force to the polarization controller at another location; said another location corresponding to the partially collapsed region The polarization controller described herein advantageously provides high-precision polarization control, reliability, and simultaneously offers has low-loss. This polarization controller can be operated relatively inexpensively and can be utilized for both classical and quantum optics applications. The offset position of the optical fiber with respect to the center of the carrier leads to an increase in stress-induced birefringence within the optical fiber and advantageously rotates the polarization of the optical signal propagating through the optical fiber.

The offset position of the optical fiber within the carrier allows for greater polarization control sensitivity, and the polarization controller utilizing a carrier with the fiber in an offset position relative to the center of the carrier provides the following advantages:
1.) lower power consumption,
2.) higher precision,
3.) high reliability due to minimized fiber damage,
4.) low optical loss, as compared to a polarization controller that utilizes a planar based electro-optical system.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary and are intended to provide an overview or framework to understand the nature and character of the claims.

The accompanying drawings are included to provide a further understanding and are incorporated in and constitute a part of this specification. The drawings illustrate one or more embodiment(s), and together with the description serve to explain principles and operation of the various embodiments.

DETAILED DESCRIPTION

Figure 1:
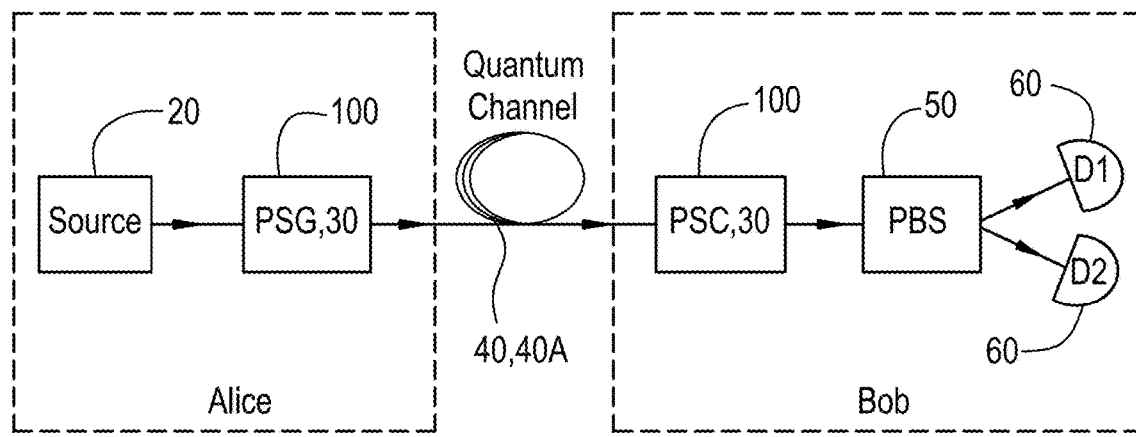
FIG. 1 is a schematic view of one embodiment of a quantum key distribution system.

One embodiment of this disclosure relates to a polarization controller 100 comprising:
(i) an optical fiber 120,
(ii) a carrier 150 surrounding the optical fiber 120, the carrier 150 comprising an off-center through hole 160 with at least one collapsed region 170, such that the optical fiber 120 is situated within the through hole and contacts at least the collapsed region 170 of the through hole and the collapsed region 170 exerts pressure on the optical fiber 120.

According to at least one embodiment, the carrier 150 is structured such that when a force is applied to the carrier 150 at the location of the collapsed region 170, the pressure on the optical fiber 120 changes, and an optical signal propagating through the optical fiber 120 undergoes a change in polarization (i.e., a change in polarization state).

According to some embodiments, an optical system comprises:
(i) a light source,
(ii) at least one polarization controller 100 comprising;
a carrier 150 surrounding the optical fiber, the carrier comprising an off-center through hole with at least one collapsed region, such that the optical fiber is situated within the through hole and contacts the at least one collapsed region of the through hole,
at least one optical fiber coupled to the polarization controller;
(iii) and at least one optical detector situated downstream of the at least one optical fiber.

According to some embodiments the polarization controller is a polarization state generator.

According to some embodiments the optical system is a quantum key distribution (QKD) system, wherein quantum key distribution (QKD) system comprises at least two polarization controllers, a quantum channel comprising an optical fiber situated two polarization controllers, and at least two optical detectors.

FIG. 1 illustrates schematically an exemplary optical system that utilizes the polarization controller 100. In this embodiment the optical system is a quantum key distribution (QKD) system 10 that utilizes the polarization controller 100 as a polarization state generator. In this embodiment the sender (Alice) sends a signal to the receiver (Bob). A polarization state generator (e.g., polarization controller 100) alters the polarization of the optical signal received from the signal source into a specific state which can be linearly (parallel or perpendicular) or circularly (left or right) polarized. At the receiving end (used by Bob) the polarization controller 100 moves or converts the polarization state of the received signal into a specified state again (e.g., either linear or circular).

More specifically, FIG. 1 illustrates that the exemplary quantum key distribution system 10 includes an optical signal source 20 coupled to a Polarization State Generator PGS (30) which in this embodiment is also a polarization controller 100, a quantum channel 40 for quantum communication coupled to the polarization controller 100, a second polarization controller 100 (PSC) coupled to and receiving signals from the quantum channel 40, and, a polarization beam splitter 50 (PBS) coupled to and receiving signals from the quantum channel 40, and two detectors (D1, D2) 60 constructed and situated to receive optical signals provided by the polarization beam splitter 50. In this embodiment the beam splitter 40 is a polarization splitter and splits the optical signal into two components of different polarization.

The quantum channel 40 comprises an optical fiber 40A that receives optical signal(s) from the first polarization controller 100 (e.g., PGS 30) and provides the optical signal(s) to the second polarization controller. The first polarization controller alters the polarization state of the optical signal received from the optical signal source 20 and provides it to the quantum channel 40. The two detectors 60 enable detection of the two optical polarizations and enables one to obtain the quantum key. Preferably, the polarization controller 100 utilized by the quantum key distribution system 10 comprises two and preferably three collapsed regions 170. The terms "communication," "connected," and "coupled" may refer to a relationship between components that supports the flow of signals between the components.

According to some of the exemplary embodiments described herein, polarization controller 100 comprises:
(i) an optical fiber 120, and
(ii) a carrier 150 surrounding the optical fiber 120, the carrier 150 comprising an off-center through hole 160 with multiple collapsed regions 170, such that the optical fiber 120 is situated within the through hole 160 and contacts at least some of the collapsed regions 170 of the through hole 160.

Various embodiments will be further clarified by the following examples.

According to one embodiment, polarization controller 100 comprises a carrier 150 (e.g., cane 150') that includes a partially collapsed through hole 160' with an offset center, and a stripped portion of the optical fiber 120 (i.e., the optical fiber portion that has no coating) situated in the off-center through hole 160'. Because the optical fiber is situated inside the carrier, no external form is applied directly to the optical fiber. The fiber is not squeezed directly, and the external force(s) applied to the carrier 150 induce stress along a length of the fiber. The offset position of the fiber 120 in the carrier 150 advantageously provides high sensitivity of the fiber to polarization rotation. (The further the hole center is situated radially from the centerline of the carrier, the more stress is created on the carrier for a given force or bend, and therefore the more birefringence is exhibited by the fiber core.)

The optical fiber 120 may be, for example, a stripped single-mode fiber. According to some embodiments, one end of the optical fiber 120 may be stripped from its coating (i.e., bare), and the stripped end may be inserted into the through hole 160. The through hole 160 is then collapsed around the stripped portion of the fiber (e.g., around the glass cladding) and is fused to the bare fiber (i.e. to the fiber cladding). The stripped portion of the fiber 120 exiting the through hole may then be coupled, for example fused, to another fiber (e.g., a pigtail fiber).

In another embodiment, a portion of the optical fiber 120 is stripped of its coating 121, such that the stripped portion of the fiber is situated between the coated sections of the fiber. A coated section 121A of the fiber 120 is then inserted into the through hole 160, and the fiber 120 is threaded through the through hole 160 such that the coated section of the fiber exits the through hole, and the stripped section of the fiber 120 is situated within the through hole. The through hole 160 is then collapsed around the stripped portion 120' of the fiber 120 (e.g., collapsed around the cladding) and is fused to the fiber cladding, forming the polarization controller 100.

The cane 150' may be composed of glass, for example pure silica glass, doped glass, coated glass, and/or coated doped glass. In this embodiment the fiber 120 has a glass cladding. The through hole 160 may be, for example, an off-center borehole. The fiber 120 is situated in an offset position with respect to the center of the carrier 150 (e.g., cane 150'). The carrier 150 (e.g., cane 150') is collapsed around the fiber at high temperature (e.g., 1000° C.-2000° C. for a glass cane), as described below. The collapsed region 170 can be of any length, but the longer the collapsed region, the more induced birefringence the propagating light sees and the larger the polarization rotation. According to some embodiments the optical fiber 120 has a portion with a stripped coating and a glass outer surface 122 corresponding to the surface of the glass cladding. The collapsed region 170 may be fully or partially surrounding the stripped portion of the optical fiber 120. As described above, the collapsed region 170 surrounds the optical fiber and is fused to the optical fiber. In these embodiments the interface between the optical fiber 120 and the carrier at the collapsed region is a fused interface.

According to another exemplary embodiment, the optical fiber 120 has a plastic cladding and the carrier 150 is plastic. The trough hole 160 of the carrier 150 is collapsed around the stripped portion of the optical fiber (in this embodiment around a portion of the fiber's plastic cladding) and the plastic material of the carrier is fused to the plastic material of the fiber cladding. In this embodiment the carrier 150 (e.g., cane 150') is collapsed around the fiber at a lower temperature, (e.g., 200° C.-750° C. for a plastic cane), and is fused to the fiber's cladding, to form the polarization controller 100.

Figure 2:
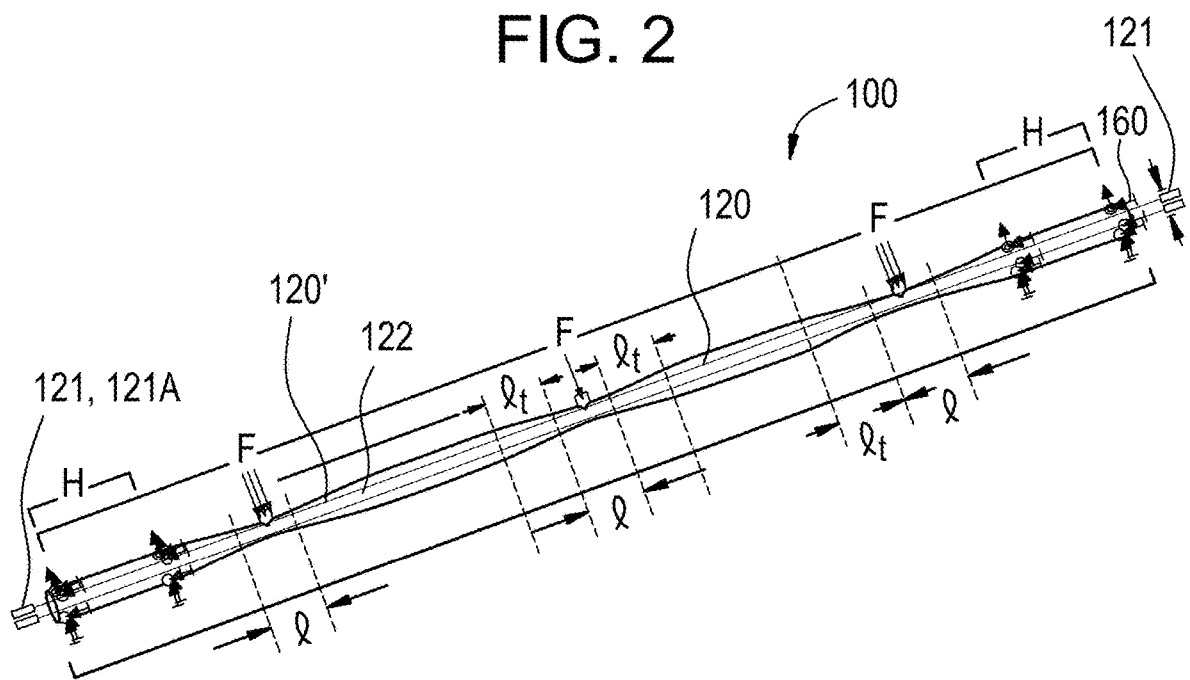
FIG. 2 is a side view of one embodiment of the polarization controller comprising multiple collapsed regions surrounding a stripped fiber.

The polarization controller 100 includes one or more collapsed regions 170 surrounding the optical fiber 120. For example, as shown Schematically in FIG. 2, the polarization controller 100 may include three (3) collapsed regions 170 surrounding the optical fiber 120.

The polarization controller 100 is preferably situated in a soft plastic (nylon) tube 150A (not shown) and supported or held by one or more holders H. The support(s) may be situated adjacent to each end of the polarization controller, such that the carrier 150 can move slightly (slip) along its center axis, or in directions normal to the central axis (e.g., in X, Y, and Z directions). This minimizes the potential breakage or cracking of the fiber 120, and also minimizes the total loss induced by the polarization controller). For example, the V-shaped clamps (not shown) may be clamped to the plastic tube 150A (not shown) supporting the polarization controller (not shown), such that the carrier can move slightly (slip) along its center axis within the plastic tube, or in directions normal to the central axis. The plastic tube 150A also protects the carrier from being scratched, or otherwise damaged. The force F is then applied to the region(s) 170, as shown for example by arrows, to induce birefringence within the core of fiber 120. For example, by slightly bending (separately) each region 170 of the polarization controller 100, one can transfer an arbitrary input polarization state of the light propagating through the optical fiber 120 to any desired output polarization sate. This bending can be applied using, for example, electro-mechanical methods. The external force can be applied separately to each region 170, directly to the carrier 150, or preferably through the plastic tube 150A supporting the carrier. For example, each region 170 can be bent separately thus allowing complete polarization state movement to any position on the Poincare sphere. In some embodiments the polarization controller 100 (or the carrier 150) is preferably held by one or more rigid supports, for example is fixtured in place using a high modulus epoxy. In some embodiments the carrier 150 is held or supported by clamps, preferably through the plastic tube surrounding the carrier.

Figure 3:
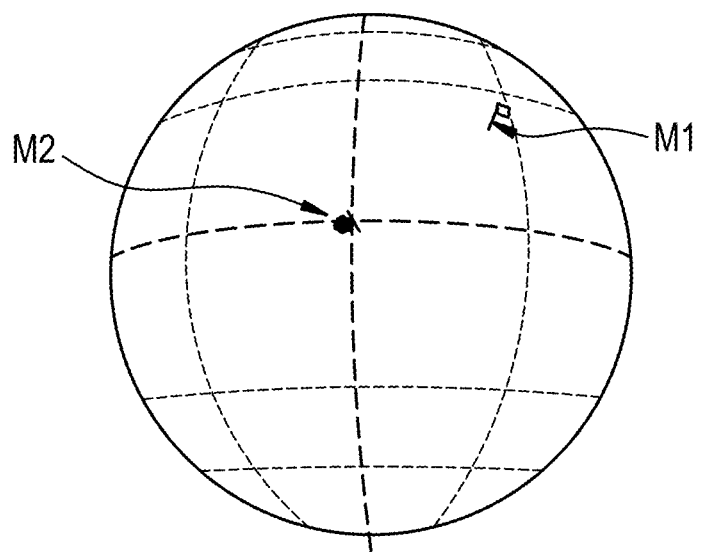
FIG. 3 depicts how an arbitrary input state of polarization (SOP) shown as marker M1 is rotated by an exemplary polarization controller to another state of polarization for output, M2.

FIG. 3. illustrates that the polarization controller 100 can rotate an arbitrary input state of polarization (SOP) shown as a marker M1 to a desired arbitrary output state of polarization, shown as a marker M2. In this embodiment, the chosen desired state of polarization output is linear.

The polarization controller 100 makes use of stress-induced birefringence phenomena when an external force is applied to rotate to any arbitrary polarization. Due to the offset position of the optical fiber 120 within the polarization controller 100, the initial light input polarization of the light coupled to the fiber 120 can be easily rotated due to experiencing an anti-symmetric and stronger stress profile within the optical fiber 120 at the collapsed region 170, compared to that produced by the same fiber situated in the carrier within the central borehole. The stress profile induces a refractive index change within the fiber core, thus rotating/converting the initial arbitrary polarization of the light propagating through the fiber core to a desired (arbitrary) output polarization.

As described above, the polarization controller 100 utilizes stressed-induced birefringence to change the polarization of the light propagating through the core of the optical fiber 120. Birefringence is a phenomenon in which the polarized light sees two different refractive indices of a material, depending on how polarization aligns with the birefringent axes. The collapsed region(s) 170 introduce stress to the fiber core situated within these regions, inducing birefringence in the material (for example glass) of the fiber core.

The length l of the collapsed region(s) 170 contributes to the amount of polarization rotation. The longer the length l of the collapsed region(s) 170 the greater the polarization rotation. More specifically, the longer the collapsed region the more retardation (difference between the speed of the orthogonally polarized states of the light) will be accumulated between two orthogonal polarization states as a result of the stress induced birefringence and thus the better control of the polarization rotation. For the light propagating within the fiber core situated within the collapsed regions, the glass index of refraction for light that is polarized parallel to the stress direction is different than the index of the light polarized normal to the stress direction. Therefore, a phase difference between the two light polarization components is produced as light passes through the segment with stress-induced birefringence. At the output of the fiber the net state of polarization is changed as a result of the accumulated phase difference.

$$K_\| = \frac{2\pi n_\|}{\lambda} \quad (1)$$

$$K_\perp = \frac{2\pi n_\perp}{\lambda} \quad (2)$$

$$\varphi_\| = K_\| l \quad (3)$$

$$\varphi_\perp = K_\perp l \quad (4)$$

$$\Delta\varphi = \varphi_\| - \varphi_\perp = (K_\| - K_\perp)l \quad (5)$$

Where, K represents the propagation constants for the two different signal polarizations (parallel and perpendicular, i.e., $K_\|$ and $K_\perp$). φ parallel and perpendicular ($\varphi_\|$ and $\varphi_\perp$) represent the phase of light propagating in these two different polarizations, l is the length of the collapsed region 170 surrounding the optical fiber, and n parallel and n perpendicular ($n_\parallel$ and $n_\perp$) are indices of refraction of the fiber core corresponding to these two different polarizations.

The through hole regions are preferably adiabatically collapsed to reduce the micro-bending fiber loss incurred during the collapsing process. The transition region, also referred as the tapered region herein may have, for example have a length $l_t$ (transition length) of 2000 µm to 1 cm. The diameter $d_{hole}$ of the through hole 160 (e.g., borehole 160') before the collapsing regions are formed, compared to diameter of the fiber portion entering the hole is such that 0.5 µm<$d_{hole}$−$d_{fiber}$<400 µm, where $d_{fiber}$ is the largest outer diameter of the fiber 120 that is being threaded through the hole 160. For example, in some embodiments, 0.5 µm<$d_{hole}$−$d_{fiber}$<300 µm, or 0.5 µm<$d_{hole}$−$d_{fiber}$<250 µm, and preferably 10 µm<$d_{hole}$−$d_{fiber}$<250 µm. Even more preferably, if a single fiber only is situated within the hole, 5 µm<$d_{hole}$−$d_{fiber}$<60 µm, or 5 µm<$d_{hole}$−$d_{fiber}$<30 µm<, or 10 µm<$d_{hole}$−$d_{fiber}$<30 µm. Most preferably, if a single fiber only is situated within the hole 160, in order to achieve low loss (prior to the collapsing step) 5 µm<$d_{hole}$−$d_{fiber}$<15 µm, or even 5 µm<$d_{hole}$−$d_{fiber}$<10 µm. When 5 µm<$d_{hole}$−$d_{fiber}$<15 µm, or even 5 µm<$d_{hole}$−$d_{fiber}$<10 µm, the macrobend loss at the wavelengths between 1250 nm and 1660 nm is minimized. The diameter $d_{fiber}$ is the diameter of either the coated fiber, or the uncoated (bare fiber), depending on whether a section of the coated fiber or the uncoated fiber is first threaded thought the through hole 160.

For example, if a typical fiber cladding diameter is about 125 microns, and the coated fiber diameter is 250 µm, the diameter of the through hole 160 needs to be sized such that the coated section of fiber 120 can be treaded through, prior to forming the collapsed region(s) 170. In this exemplary embodiment $d_{fiber}$ is the diameter of the coated fiber that has been threaded through the through hole 160.

For example, in one embodiment, the hole 160 is larger than 250 µm, so that a coated fiber 120 (which has an outer coating diameter of 250 µm) will be able to thread through the through hole 160, prior to creating collapsed region(s) 170 around the uncoated section(s) of the fiber. In the embodiments where a coated section of the fiber 120 is inserted into the through hole 160, the hole diameter $d_{hole}$ may be, for example, 0.5 µm to 300 µm larger than the coated fiber diameter. Preferably, in order to minimize loss, the hole diameter $d_{hole}$ may be 5 µm to 300 µm larger than the coated fiber diameter, and more preferably 5 µm to 50 µm larger than the coated fiber diameter, even more preferably 5 µm-30 µm larger than the coated fiber diameter, and most preferably 5 to 15 µm larger than the diameter of the coated fiber. Thus, in such exemplary embodiments, if the coated fiber diameter is 250 µm, and only one fiber is threaded through the hole 160, the diameter of the hole 160 may be 255 µm to 280 µm, or 255 µm to 275 µm (e.g., 260 µm or 270 µm). Thus, according to some embodiments, if the diameter of the through hole 160 needs to accommodate a coated fiber (prior to the carrier being collapsed onto uncoated fiber section), the diameter $d_{hole}$ of the through hole 160 is preferably 5 µm-30 µm (e.g., 5 µm-15 µm, or 5 µm-10 µm,) larger than the diameter $d_{fiber}$ of the coated fiber.

In an embodiment where only a stripped portion of the fiber is threaded through the through hole 160, and the fiber cladding has a diameter of about 125 µm, the diameter of the hole 160 is 0.5 µm to 300 µm larger than the diameter of the stripped (i.e., bare) fiber, and preferably 5-50 µm larger than the diameter of the stripped fiber (i.e., 5-50 µm larger than the diameter of the cladding). A through hole 160 with the hole dimeter that is only a 0.5 to 5 µm larger than the diameter of the threaded uncoated fiber may induce sharp bends as the fiber is threaded through the hole, which may result in micr-bend losses in the fiber, or even micro-crack formation and reduced device longevity. If the hole diameter $d_{hole}$ is significantly larger than the fiber diameter (e.g., by greater than 400 µm), the air gaps within the hole 160 surrounding the fiber in portion(s) the of the through hole that are not collapsed may also create signal loss, by inducing sharp fiber bends or twists within the through hole 160. Preferably, in order to minimize loss created by the polarization controller, in the embodiments where only a stripped portion of the fiber is threaded through the through hole 160, the through hole diameter is 5 µm to 60 µm larger than the diameter of the uncoated (i.e., stripped) fiber, for example 5 µm to 50 µm larger than the diameter of the uncoated fiber, and more preferably 5 µm to 30 µm or 5 µm to 20 µm larger than the diameter of the uncoated fiber. In such embodiments, the uncoated (stripped) fiber diameter is the outer diameter of the fiber cladding. Thus, if the stripped fiber diameter is 125 µm, the diameter of the hole 160 may be 135 µm to 185 µm, 135 µm to 175 µm, 135 µm to 160 µm, or 135 µm to 155 µm.

Preferably, in order to maximize performance of the polarization controller 100 and in order to minimize microbending losses prior to collapsing the carrier and forming the collapsed regions 170, the difference Δ between the through hole diameter and the fiber diameter that has been treaded through the hole ($\Delta = d_{hole} - d_{fiber}$) is 10 µm to 60 µm. For example, dhole−$d_{fiber}$ may be 5 µm, 6 µm, 8 µm, 10 µm, 15 µm, 20 µm, 25 µm, 30 µm, 35 µm, 40 µm, 35 µm, 40 µm, 50 µm, 55 µm, 60 µm or therebetween. If the hole is too small, the optical fiber 120 will get stuck, and won't go all the way through. If it is too big, it can result in macro bending losses, micro bending losses, and also twisting which limits the polarization control capability.

More preferably $d_{hole}$−$d_{fiber}$ is 5 µm to 50 µm, for example 5 µm to 15 µm. In some embodiments $\Delta = d_{hole} - d_{fiber}$ is 20 µm to 60 µm, or 20 µm to 55 µm, or 20 µm to 50 µm. Most preferably, $d_{hole}$−$d_{fiber}$ is 5 µm to 20 µm, for example 5 µm to 15 µm, or 5 to 10 µm We believe that the collapse taper loss (macrobend induced loss) is a is a large contributor to signal loss in the polarization controller 100. The smaller the hole 150, the lower the macrobend loss. Accordingly, in order to minimise macrobend losses, it is preferable that, $d_{hole}$−$d_{fiber}$ is 5 µm to 30 µm, or 10 µm to 20 µm, or 5 µm to 15 µm, or even 5 µm to 10 µm. In some embodiments $d_{hole}$−$d_{fiber}$ is 10 µm to 20 µm.

The tapered (or arced) region 175 of the through hole 150 is the transition region of the through hole 150 situated between the completely open region 172 of the through hole and the region 170. The tapered region size and geometry can also be utilized to minimize bend-induced loss. The longer tapered region (i.e., the longer length of the taper $l_t$), minimizes the bend loss. If the taper is too steep (i.e., if the length of the taper $l_t$ is short) the taper region will contribute to the macrobend loss(es). In some embodiments $l_t$>2 mm, for example 2 mm to 6 mm. A longer tapered (e.g., arced) region can be achieved while moving the carrier 50 through the heat zone during the collapsing step. The fiber 120 may be bent due to the constraint of the collapsing inner walls of the through hole 150 as they fuse to the fiber. The length $l_t$ of the tapered hole region is the length that allows the optical fiber 120 to be supported within the through hole 150 such that when the slope or radius of the fiber 120 when the fiber is bent due to the constraint of the collapsed inner walls, the region 175 does not induce macrobend loss(es) greater than 0.2 dB at 1550 nm, and preferably not greater than 0.1 dB at 1550 nm.

As described above, in order to minimize microbending losses, one can utilize a through hole 160 that is slightly larger (e.g., 10 µm-30 µm, or 10-15 µm larger) than the bare (stripped) fiber diameter, in order to be able to insert the stripped fiber into the through hole 160. One can then splice a pigtail fiber or another optical fiber 122 (not shown) to the optical fiber 120, after the insertion of the fiber 120, either before or after the collapsing step that forms collapsed carrier regions 170. This approach would allow for minimal macrobending induced loss. Furthermore, the splicing of the optical fiber 120 to another fiber 122, for example to a single mode fiber such as Corning® SMF 28®, can be performed with a fusion splicer resulting in low coupling loss ((e.g. 0.01 to 1 dB) (measured by OTDR, at 1550 nm wavelength)

Planar electro-optical (e.g., lithium-niobate) chip based polarization controllers used in in quantum systems typically suffer from the high coupling loss (~3 dB), due to planar chip to single mode fiber coupling. In contrast, the polarization controller 100 described herein is an all-optical device that utilizes fiber-to-fiber coupling. The coupling loss between two optical fibers may be, for example, 0.01 dB to 0.7 dB.

Another approach for minimizing microbending losses is to utilize one or more "dummy" fibers to fill in the excess space in the through hole 160, should it be significantly larger than the stripped fiber diameter $d_{fiber}$. For example, if the polarization controller 100 utilizes a typical single mode optical fiber 120 with a 125 µm cladding diameter and an offset through-hole 160 with the through hole diameter $d_{hole}$ of 250 µm or larger, at least one additional fiber ("dummy fiber") can be inserted into the through hole 160 to minimize microbending of fiber 120 while creating collapsed carrier regions 170 during the collapsing process The "dummy" fiber is an uncoated (stripped) fiber that does not propagate signal light, and does not significantly contribute to optical losses. In such embodiments $d_{hole}$ may be, for example, about 200-550 µm, and the coupling loss between two optical fibers 120, 122 is ≤1 dB, for example 0.01 dB to 0.7 dB.

Figure 5:
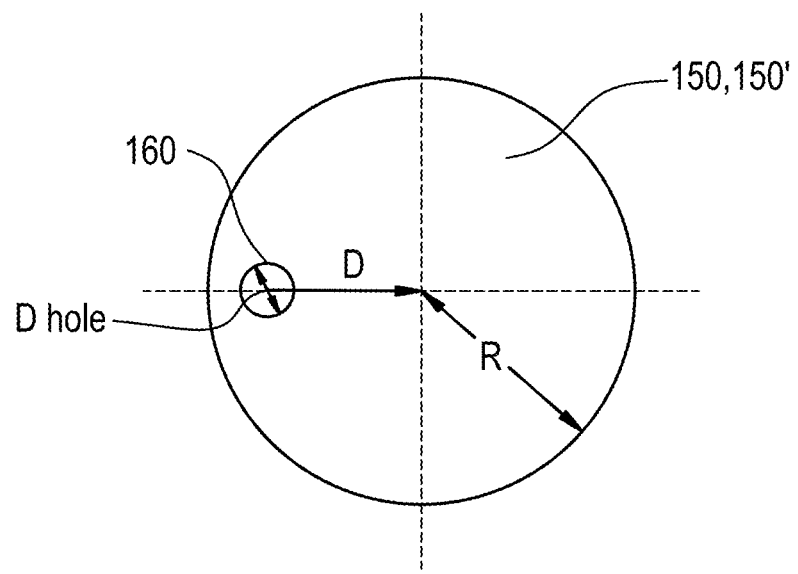
FIG. 5 is a cross-sectional view of a polarization controller according to one exemplary embodiment.
Figure 6:
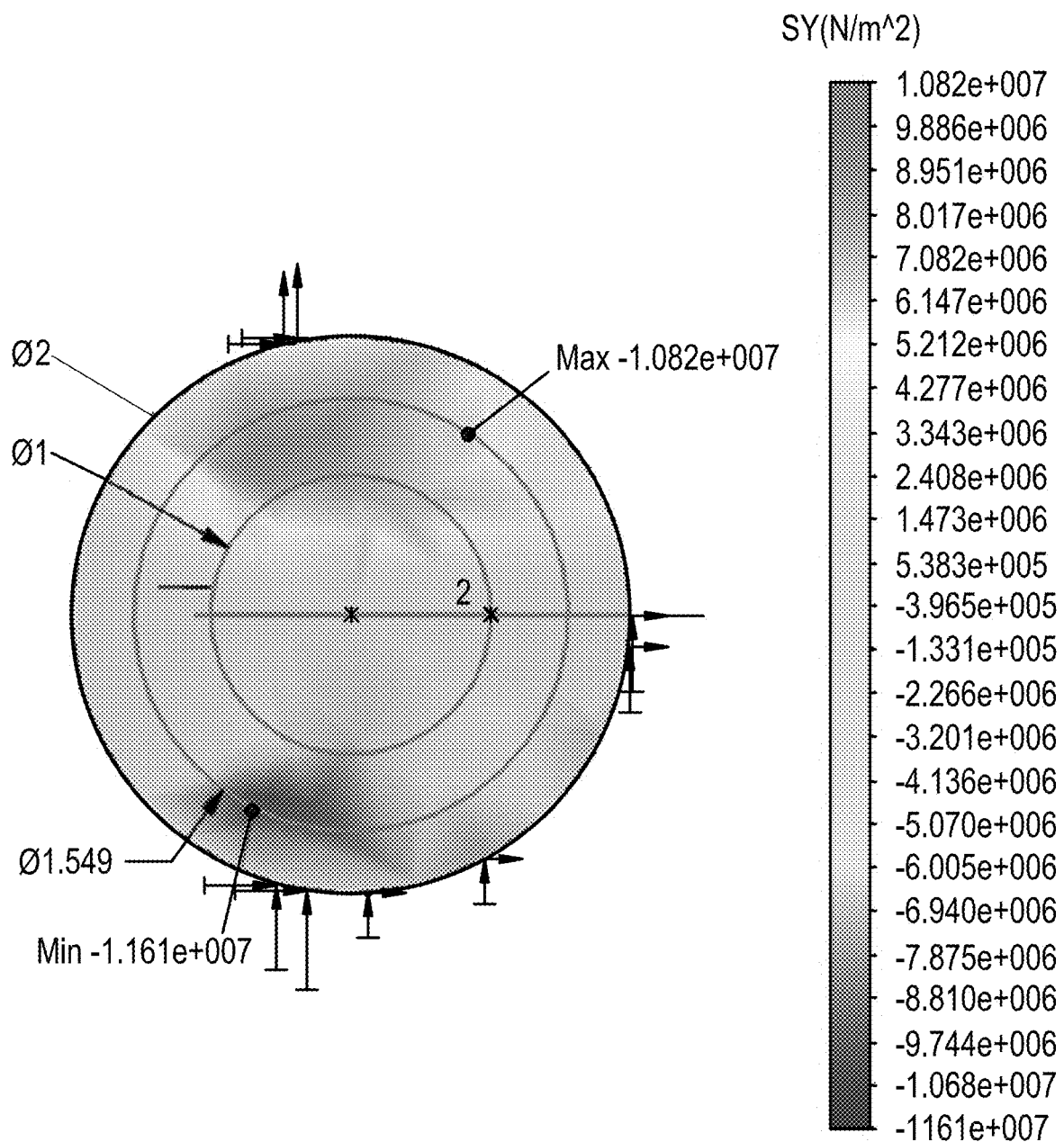
FIG. 6 is a cross-sectional image of simulated compression/tension along a glass rod when an external force is applied.
Figure 12:
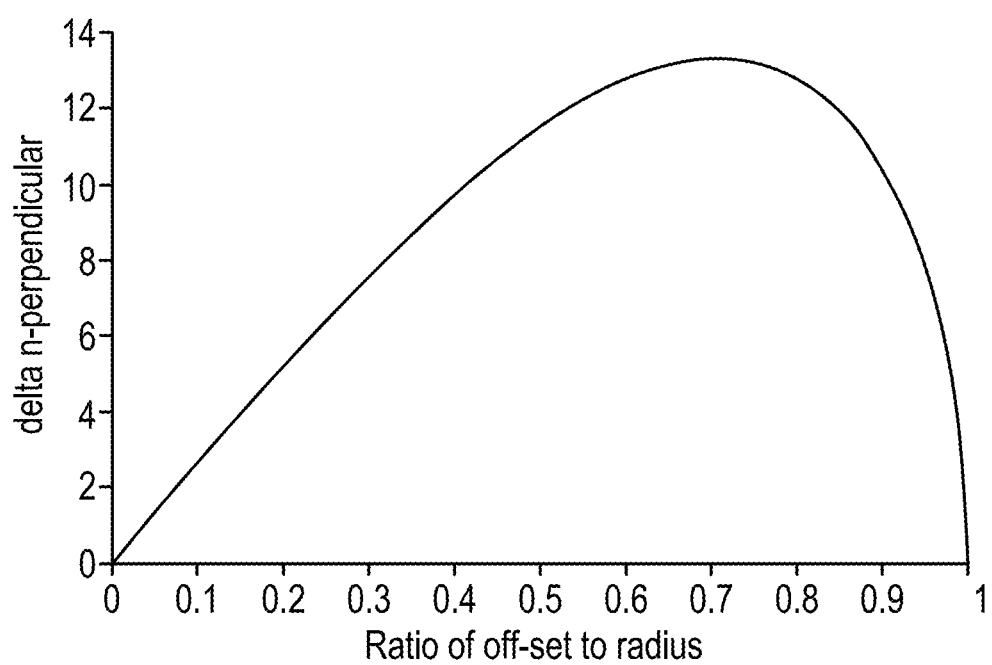
FIG. 12 illustrates that for one embodiment of the polarization controller the optimized position for the borehole center is when D/R=0.7072.

Preferably, in order to improve the sensitivity of the polarization controller, 0<(D/R)<1, where D is the distance from the center of the carrier 150 to the center of the through hole 160, and R is the outer radius of the carrier 150 (or the average half width of the carrier 150, if the carrier does not have a circular cross-section). Preferably, the through hole 160 (e.g., borehole) has an axis of symmetry that is located such that that 0.25<D/R<0.9, and preferably 0.4<D/R<0.85. In at least some embodiments, the through hole 160 has a cross-section of 0.5 µm to 275 µm width and an axis of symmetry that is located at a distance D from the carrier's center such that 0.5<D/R<0.8. More preferably, 0.6<D/R<0.8, and even more preferably 0.65<D/R<0.8. In some embodiments, 0.7≤D/R≤0.75. In one embodiment, as seen in FIG. 5, the borehole and therefore the fiber situated therein are positioned off-center such that they are located at ¾ of the of the radius R from the cane's center (i.e., D/R=3/4). In this embodiment, this position is shown through simulation to experience the strongest amount of stress in a bend, seen in FIG. 6. FIG. 12 illustrates that in one embodiment the optimized position for the through hole corresponds to the ratio D/R=0.7072.

1. The through hole 160 can be formed in any geometry or design, for example a spiral shape along the length of the carrier 150. It can also be circular, elliptical, triangle, diamond shaped, or any other shape. The collapsed region can be of any length, but it has been experimentally shown that longer lengths are better, and in one exemplary embodiment it is 6 cm long. The polarization controller 100 may include one or more collapsed regions, for example multiple regions of varying collapsed lengths 1. In some embodiments 1 cm≤l≤15 cm, 2 cm≤l≤15 cm, 2 cm≤l≤10 cm, or 2 cm≤l≤8 cm, or 2 to 7 cm, and preferably or 2 cm to 6.5 cm (to reduce the size of the carrier).

Figure 7:
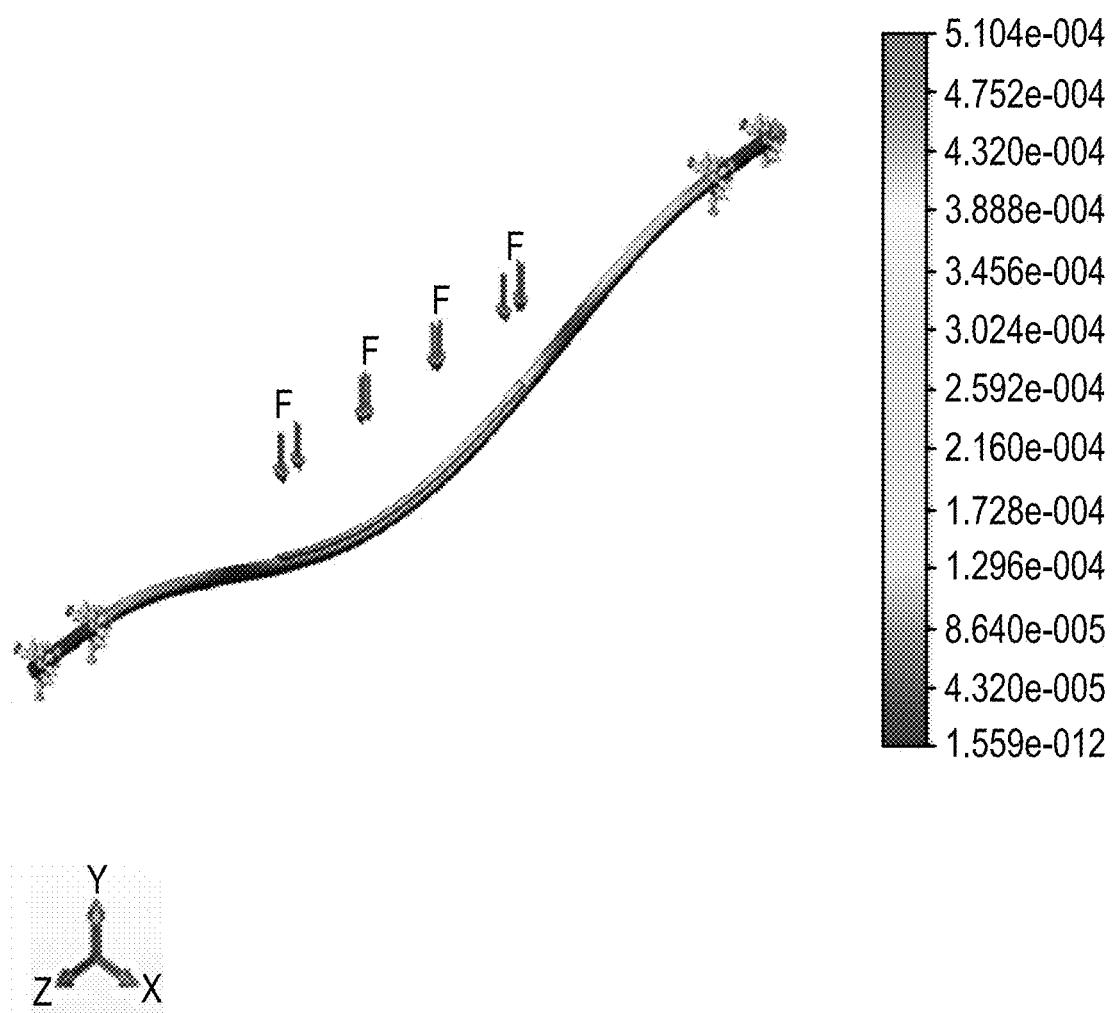
FIG. 7 illustrates is a simulation of the applied force along a length of the polarization controller when two ends of the polarization controller are fixed.
Figure 8:
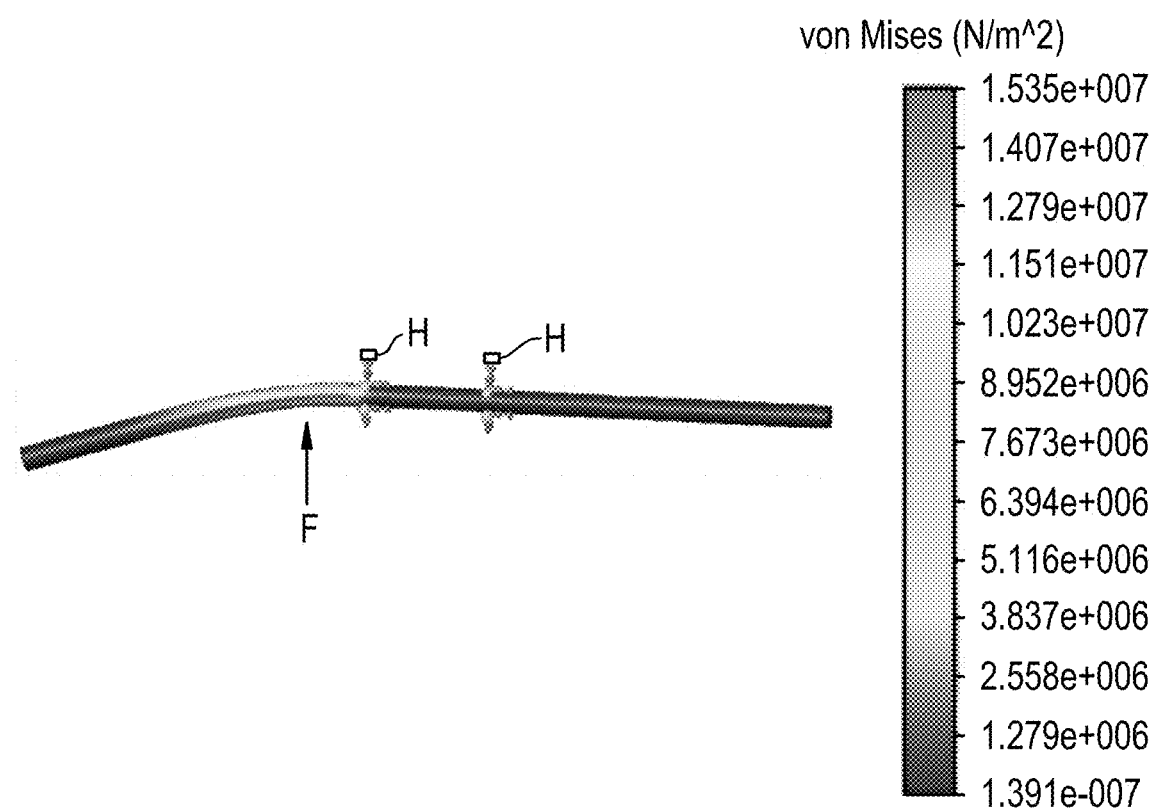
FIG. 8 illustrates simulation of the applied force and stressed experienced by the polarization controller when the polarization controller is supported by one end.

The rotation of polarization is induced by the sum of the induced birefringence across the transverse and longitudinal directions of the device polarization controller 100. This induced birefringence phenomenon originates from the stress the carrier 150 experiences when subjected to an external force field. The force F can be used in the configuration of two fixed ends and force F may be as demonstrated in FIG. 7, for example to the collapsed region However, the force field can also be applied in a configuration such that one portion (e.g., one end) of the polarization controller 100 is fixed by the holders H, as shown in FIG. 8. The polarization controller 100 may be fixed using a series of mountings and may have a series of multiple collapsed regions 170. In some embodiments the polarization controller 100 comprises two collapsed regions 170. In some embodiments the polarization controller 100 comprises three or more collapsed regions 170. Preferably, the polarization controller 100 comprises 2 to 5 collapsed regions 170.

Accordingly, one method of controlling polarization of the light propagating through an optical fiber 120 comprises:
(i) supporting a polarization controller 100 comprising a carrier 150 with an off-center through hole 160 with at least one partially collapsed region 170 surrounding the optical fiber 120 at at least one location, and
(ii) applying a force to the carrier 150 at another location; wherein this another location corresponds to the at least partially collapsed region 170.

One method of controlling polarization of the light propagating through an optical fiber 120 comprises:
(i) supporting a polarization controller 100 comprising a carrier 150 with an off-center through hole 160 with at least one partially collapsed region 170 surrounding the optical fiber 120 at at least one location, and
(ii) bending or twisting the carrier 150.

Other configurations of this polarization controller 100 can include for example, a spiral hole 160, a collapsed hole 160 that has been tapered, as well as a notch, a horseshoe or any other geometrical shape, as a stress concentrator. The through hole 160 can formed in any geometry or design, for example a spiral shape along the length of the carrier 150. It can also be circular (present embodiment), elliptical, triangular, diamond shape, or any other cross-sectional shape. Other types of stress concentrator are fibers with stress rods (e. g., Panda type polarization maintaining fiber), fibers containing air holes (e.g., photonic crystal fiber). Other alternative approaches can be embodied with any combination of the aforementioned embodiments. The applied force is applied in 1-dimension, 2-dimensions, and/or 3-dimensions for better control of the polarization rotation. For example, the force on the carrier may be applied in the X-Y plane (radially, towards the fiber, not solely along the axis of the fiber).

Figure 9A:
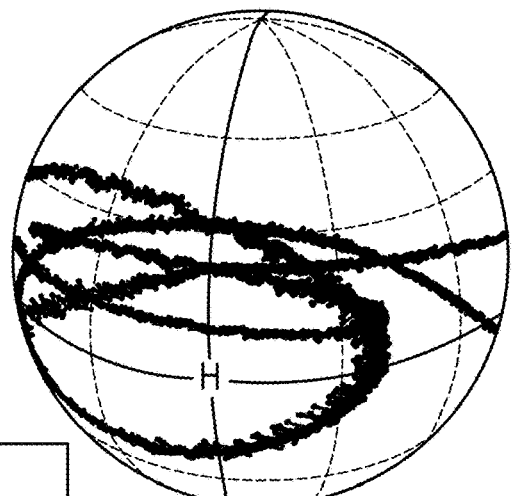
FIGS. 9A and 9B illustrate polarization rotation when the polarization controller is under an applied external force from 0-100 gF.
Figure 9B:
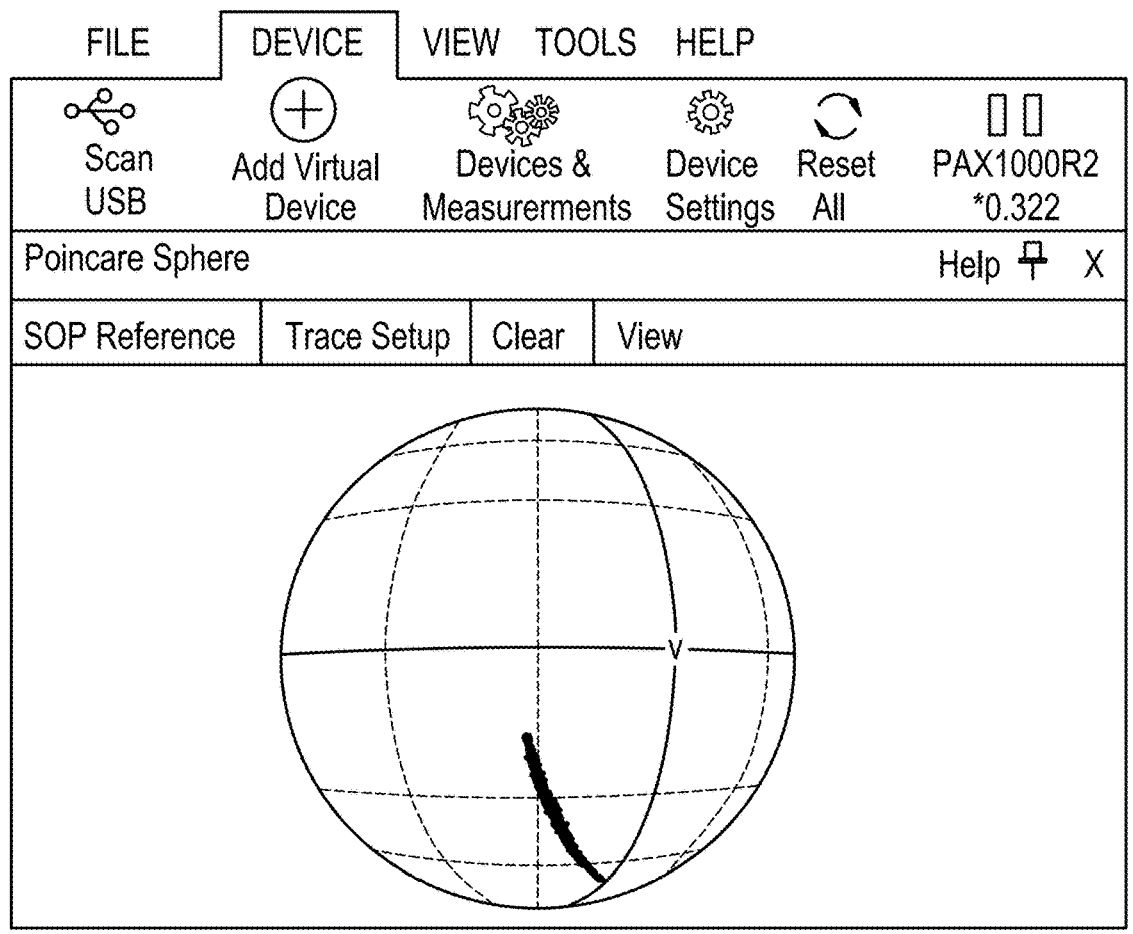

As demonstrated and shown in FIGS. 9A and 9B, polarization rotation through an applied external force is induced by stress-induced birefringence. According to some embodiments, the amount of the applied force at each location is greater than 0 gF, and not greater than 200 gF (200 grams of force), preferably not greater than 100 gF, for a carrier diameter of 3 mm or less. According to some embodiments, the amount of the applied force at each location is greater than 1 gF, and not greater than 100 gF, for example 1 gF to 50 gF, preferably 1 gF to 20 gF, and more preferably 1 gF to 10 gF. The low force of 10 gF or less can to produce a bend of large radius, minimizing any severe damages to the fiber by avoiding torsion force. For example, in one embodiment, 7 grams of force can be utilized to move a 1 cm collapsed section (L=1 cm) to a bend radius of 0.5 meter. In another embodiment 2 gF (2 grams of Force) is utilized, for example by (i) by using a linear stage that pushes a finger against the carrier; or (ii) a cam activated by a motor.

Figure 10:
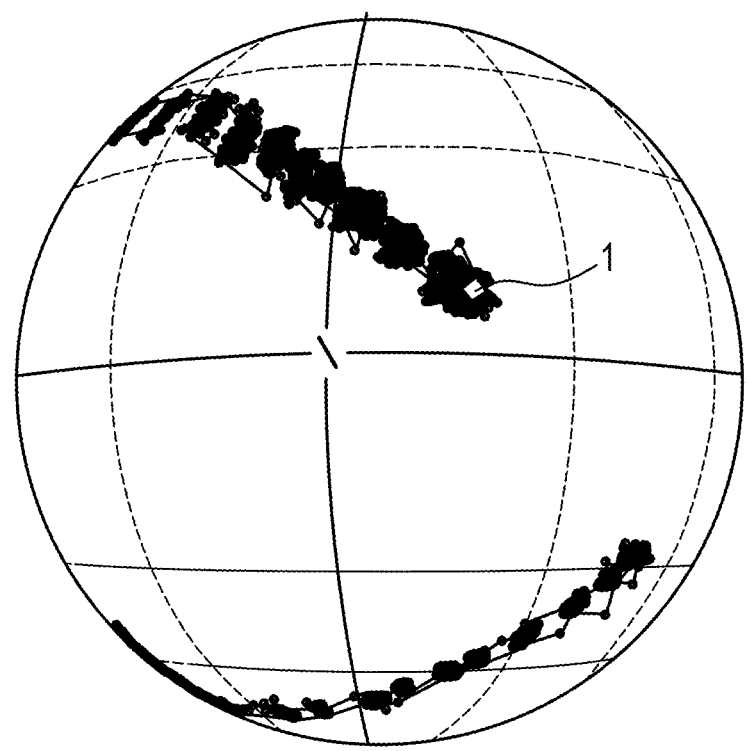
FIG. 10 is a illustrates good repeatability of the polarization controller when under testing.
Figure 11:
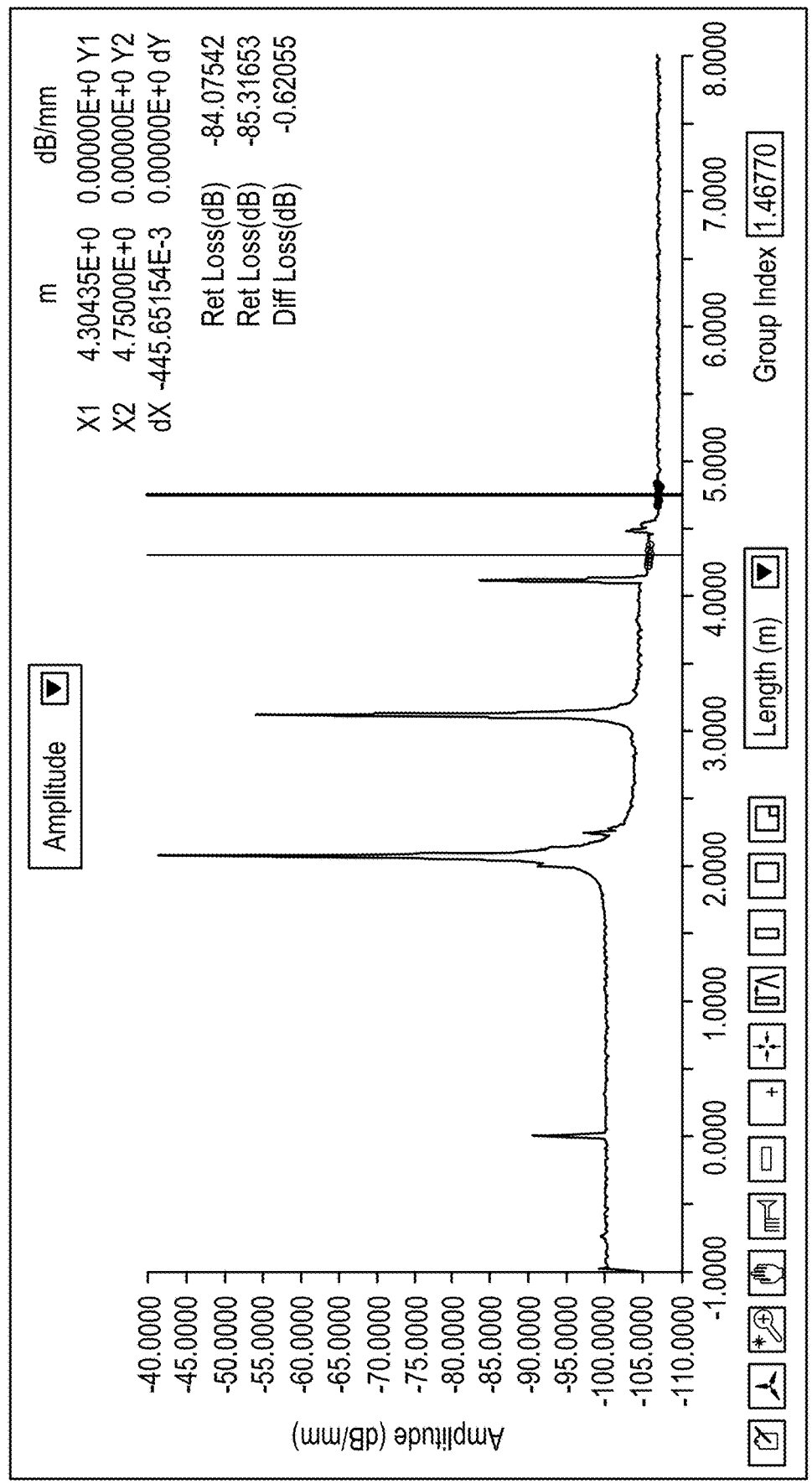
FIG. 11 illustrates measured loss of the polarization controller provided by a back-scattering OTDR measurement.

The total cumulative birefringence along the transverse and longitudinal directions allows for greater than 360 degrees rotation in at least one direction. FIG. 10 demonstrates the repeatability of the polarization controller 100 as pressure is applied and removed. The polarization rotation as a function of bending can be mathematically described using known algorithms. For this embodiment, the voltage relates to a bending rather than an electro-optical effect. As shown in FIG. 11, in one embodiments, the measured loss across the polarization controller 100 is about 0.7 db.

The force is applied in 1-dimension, 2-dimensions, and/or 3-dimensions for better control of the polarization rotation. As demonstrated in FIGS. 9A and 9B polarization rotation is induced by an applied external force that induces stress-induced birefringence. The birefringence-induced optical retardation accumulated over the length of the collapsed region has enabled over 360 degrees of rotation on the Poincare sphere in at least one direction. FIG. 9A shows results of polarization rotation for an embodiment wherein the input of the device was excited with a Fabry-Perot semiconductor laser operating on multiple longitudinal modes and wherein one end of the collapsed region was firmly held in place by a clamp while force of varying magnitude was applied at the opposite end of the collapsed region in a direction normal to the glass cane. The length of the collapsed region was 6 cm and the optical fiber waveguide was SMF-28. FIG. 9B shows results of polarization rotation for another embodiment wherein the length of the collapsed region was 2 cm and the optical fiber waveguide was polarization-maintaining Panda fiber. The input of the device in this example was excited by a single-frequency semiconductor laser operating at 1550 nm, the transmission losses of the device were 0.6 dB, and the degree of polarization during the polarization-rotation measurement was 92%.

FIG. 10 demonstrates the repeatability of the polarization controller 100 as force is applied and removed in small steps. The polarization is seen to follow the same path on the Poincare sphere during multiple cycles of increase and decrease of the force over the experimental range. The polarization rotation as a function of bending can be mathematically described and modeled. For our case, the voltage relates to a bending rather than an electro-optical effect. The measured loss across the polarization controller 100 has been demonstrated to be less than 2 dB or even less than 1 dB. In some embodiments the loss across the polarization controller 100 is 0.3 dB to 1 dB. In some embodiments the loss across the polarization controller 100 is 0.1 dB to 1 dB, for example 0.12 dB, 0.15 dB, 0.2 dB, 0.3 dB, 0.6 dB, 0.7 dB, 0.8 dB or therebetween. As shown in FIG. 11, in one embodiment of the polarization controller 100 the measured loss is −0.7 db.

Example 1

A Carrier with an Off-Set Borehole.

In this exemplary embodiment the center of offset borehole 160' of the carrier 150' is located at a relative ¾ distance from the center of the carrier, for optimal stress profile. In this particular embodiment, the carrier 150' is cylindrical). That is, in this embodiment the ratio of D/R=3/4, where R is the radius of the carrier's cross-section. Thus, the location of the optical fiber 120 from the center of the glass cane is offset from the radial center of the cane by ¾ R. In this embodiment the outer diameter of the carrier 150 (cane 150') is approximately 2 mm. Accordingly, R=1 mm and the diameter of the borehole prior to the collapsing step is about 175 μm.

A stripped optical fiber 120 (i.e., an optical fiber that has at least of a portion of the coating removed, exposing the outer surface of the cladding) is fed through the borehole 160'. The optical fiber 120 can be a single mode fiber, a polarization maintaining fiber, a multimode fiber, a few mode fiber, a multicore fiber, or any other kind of optical fiber. In this embodiment, the optical fiber 120 is a single-mode fiber with a glass core and glass cladding (e.g., Corning® SW' 28® fiber available from Corning incorporated, of Corning N.Y., THORLABS PM fiber ("Panda" or "Bow-Tie" type), or Corning PM Panda fiber). In this embodiment the fiber cladding diameter is 125 μm.

It can be advantageous for the polarization controller 100 to comprise a polarization maintaining fiber (PM fiber) 120 when such fiber is utilized in conjunction with a glass carrier 150. The force of collapsing the glass carrier 150 onto a glass fiber causes viscous forces to freeze within the glass carrier 150 as glass carrier 150 cools to room temperature. These stresses can vary significantly with length and may causes problems with the operation of the polarization controller 100. The performance of the polarization controller 100 is improved when a polarized mode remains in that mode as light propagates through the optical fiber situated within the carrier. This can be advantageously achieved by the use of the polarization maintaining fiber as the optical fiber 120. Then, when the carrier 150 is bent, one polarization mode is acted on differently from the other polarization mode in a continuous manner as light propagates through the length of the optical fiber within the carrier. If there is polarized mode coupling present due the stress variations with length of the fiber, then there can be unwanted compensation of the bending force as a function with length. The use of polarization maintaining fiber (e.g., a Corning PM15-U25D 1550 nm type fiber, available from Corning N.Y.) prevents this from happening, and enables a continuous and smooth separation with length of the two propagating polarization modes within the bend.

It is noted that annealing the carrier fused to the fiber 120 minimizes the unwanted stress induced variations in the collapsed region and also enables better performance of the polarization controller 100. However, it may be difficult to completely eliminate these stresses through annealing.

Preferably, the beat length of the polarization maintaining fiber 120 is not greater than 2 cm and is greater than 1 mm at the wavelength of operation (e.g., at 1550 nm). The beat length of the polarization maintaining fiber is preferably less than 1 cm at the wavelength of operation. In some embodiments, applicants utilized a polarization maintaining (PM) fiber 120 with a beat length of 2 mm to 5 mm.

The borehole 160' is collapsed at the desired locations, fusing the interface of the bare fiber to the carrier to form the polarization controller 100. The resultant collapsed region 170 can be of any length 1, but in this exemplary embodiment 1=6 cm. The carrier 150 can have one or more collapsed regions 170 separated by any arbitrary lengths, but in this embodiment the carrier 150 contains one collapsed region 170 situated and fused around the cladding of the optical fiber. In this exemplary embodiment the transition region, also referred as the tapered region herein has a length $l_t$ (transition length) of 2600 microns.

The carrier 150 is then subjected to an external force that causes a bend and or deviation from a neutral position, for example via a mechanical, thermal, and or piezoelectric method.

In this embodiment the cane 150' is composed of titanium coated, fluorine-doped $SiO_2$ glass and includes an off-center borehole 160 (i.e., the center of the bore hole is offset from the center of the carrier). In this embodiment the carrier 150 is a glass carrier comprising silica doped with 1.2 wt % fluorine.

The glass carrier 150 may also be doped with Boron or any other type of dopant to reduce the thermal temperature needed to collapse the borehole without causing the diffusion of Germania from the core, thus minimizing the expansion to the mode field. This helps maintain low loss (<0.7 db). In some embodiments, the carrier is a silica doped glass, and amount of Boron and/or Fluorine is between 1 wt % and 8 wt %. In this embodiment, a single-mode fiber (for example, Corning® SMF 28® fiber) was fed through the borehole 160' before the borehole 160' was collapsed around the fiber.

Although in other embodiments the polarization controller 100 includes multiple collapsed regions, in this embodiment the polarization controller 100 has a single collapsed region 170. In this embodiment, in order to collapse the carrier at the desired region, a burning flame from a heater (burner) 200 was introduced around the cane 150'. For an $SiO_2$-based cane the temperature needed to collapse the borehole is between 1000° C. and 2000° C., for example 1600-1800° C., or 1700-1800° C. The required heat can be also applied by an infra-red (IR) laser, or an electrical heater (e.g., platinum coil heater).

In this embodiment, the temperature inside the burner 200 was 1723° C. The desired temperature is achieved by varying the ratio of the methane ($CH_4$) and oxygen ($O_2$).

According to some embodiments a 2 to 1 ratio ($CH_4$=0.5 02=is used to produce the desired temperature of at least 1700° C. needed for $SiO_2$ based carrier 150 to melt or soften the carrier glass. If, as in this embodiment, the carrier 150 comprises silica doped with Fluorine or Boron, the melting temperature of the carrier glass drops below that of pure silica, and $CH_4$=0.5 $O_2$=0.8. The temperature is measured with a thermocouple type B (range: 810° C. to 1700° C.) and type K (range 293° C. to 1260° C.). The thermocouple is held at the same location where the actual cane will be subjected to the burner. In this embodiment, the speed at which the burner is moving along the carrier, to ensure that the carrier has been heated to the desired temperature, is 0.5 mm/sec.

Figure 4:
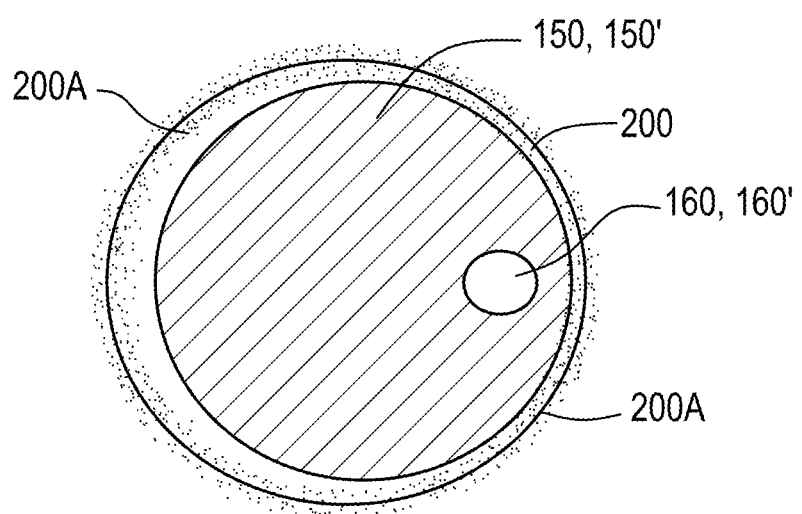
FIG. 4 is a cross-sectional view of the carrier, bore hole, and flame geometry.

The cane 150' was situated asymmetrically inside the burner flame, as shown in FIG. 4. The off-center borehole was situated on the side closest to the flame 200A. The introduction of such high temperature around a borehole is accompanied by increase of the pressure inside the borehole. In order for collapse to happen that high-pressured air must be at least partially evacuated. A vacuum pump is utilized during the collapsing step, so that the cane collapses around the fiber cladding. In this embodiment the pressure is −17 psi. The burner 200 (or a laser beam from an IR laser) moves along the length of the cane to produce the desired collapse region length. The process of heating and collapsing the cane region(s) around the fiber also fuses the fiber to the inner surface of the cane at the collapsed regions.

It is important that the transition from the fully non-collapsed region of the carrier to the fully collapsed region be smooth (i.e., not steep or abrupt) so as not to induce microbending or macrobending perturbations that will cause light to couple from the first mode to a higher order cladding mode within the collapsed region.

In this exemplary embodiment, the fused interface between the borehole and the fiber 120 is adiabatically collapsed to reduce the micro-bending loss incurred during the collapsing process and the transition zone is 2600 microns in length.

The diameter of the borehole compared to the optical fiber size is such that 0.5 µm<$d_{hole}$−$d_{fiber}$<250 µm, where $d_{fiber}$ is the diameter of the fiber cladding. In this embodiment, $d_{fiber}$ is the outer glass diameter of the fiber, after the coating layer(s) have been stripped. In this exemplary embodiment, $d_{hole}$−$d_{fiber}$~50 µm. The off-center position of the borehole/fiber is positioned ¾ of the distance from center of the cane, which is ¾ of the of the radius from center of the cane 150' as seen in FIG. 5. This position is shown through simulation to experience the strongest amount of stress in a bend, seen in FIG. 6. However, while less effective, the borehole may be positioned at any position where 0<D/R<1. For example, the carrier may be a Fluorine or boron doped glass tube, the through hole may have a cross section diameter of 0.5 µm to 275 µm and an axis of symmetry that is located at a distance D from the center of the carrier, such that 0.25<D/R<to 0.4, where R is the half width of the carrier cross-section.

The collapsed region 170 can be of any length, but it has been shown experimentally that longer lengths (>0.5 cm) are better, and in this embodiment l=6 cm. However, the polarization controller 100 may include more than a one collapsed region of varying collapsed lengths.

The rotation of polarization is induced by the total birefringence across the transverse and longitudinal direction of the device polarization controller 100. This birefringence phenomena originates from the stressed the carrier 150 experiences when subjected to an external force field. The force F can be used in a configuration of two fixed carrier ends, and applied to the collapsed region as demonstrated in FIG. 7. However, the force F can also be applied in a configuration where only one end of the polarization controller 100 is fixed as shown in FIG. 8. The polarization controller 100 can be held using a series of mounts and may include a series of multiple collapsed regions surrounding one or more optical fibers.

Typical commercial fiber polarization controllers utilize clamp-twisting motions applied directly to the fiber needed to induce stress birefringence. However, the polarization controller 100 described herein does not use any direct twisting or clamping of fiber 120. Instead the forces are applied to the carrier 150. The optical fiber 120 does not experience direct damage and therefore, and therefore does not degrade over time, making it more stable and reliable.

The polarization controller 100 is capable a high precision polarization control. More specifically, the length(s) l of the collapsed region(s) 170 allows the user to rotate polarization over wider range of angles, due to the sum of induced birefringence. The polarization controller 100 can comprise more than one collapsed regions (for example: three) which allows complete control of polarization movement on the Poincare Sphere.

The polarization controller 100 can be advantageously used with low power consumption. Because the polarization controller 100 described herein comprises a carrier and a fiber or fibers situated in an off-set position with respect to the carrier center, this configuration allows for asymmetric stress inducement, and allows the optical fiber to be more sensitive to externally applied forces. Thus, very small external forces are needed to rotate the polarization when utilizing polarization controller 100. Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A polarization controller comprising:
(i) an optical fiber,
(ii) a carrier surrounding the optical fiber, the carrier comprising an off-center through hole with at least one collapsed region, such that the optical fiber is situated within the through hole and contacts the at least one collapsed region of the through hole, and the collapsed region exerts pressure on the optical fiber.

2. The polarization controller of claim 1, wherein the carrier comprises glass.

3. The polarization controller of claim 1, wherein the carrier is a glass tube.

4. The polarization controller of claim 1, wherein: the carrier is a Florine and/or boron doped glass tube, the through hole has a cross section of 0.5 µm to 275 µm and an axis of symmetry that is located at a distance D from the center of the carrier, such that $0.25<D/R<$ to 0.95, where R is a half width of the carrier cross-section.

5. The polarization controller of claim 1, wherein: at least a portion of the optical fiber situated inside the through hole contains an outer glass surface that is fused to the collapsed regions of the through hole.

6. The polarization controller of claim 1, wherein the optical fiber is a single mode fiber, a multimode fiber, a multicore fiber, a few-mode fiber, or a polarization maintaining fiber.

7. The polarization controller of claim 1, wherein the optical fiber is a polarization maintaining fiber with a beat length of not greater than 2 cm at a signal wavelength.

8. The polarization controller of claim 1, wherein:
(i) the optical fiber is a single mode fiber, a multimode fiber, or a polarization maintaining fiber with a glass cladding; and
(ii) the carrier is a fluorine and/or boron doped glass tube.

9. The polarization controller of claim 8, wherein the glass tube is coated with titanium.

* * * * *